United States Patent [19]

Stiles et al.

[11] Patent Number: 4,654,500
[45] Date of Patent: Mar. 31, 1987

[54] UNDERWATER ARC WELDING

[75] Inventors: Richard B. Stiles, Kemnay; Arun J. Rathod, Auchterless, both of Scotland

[73] Assignee: K.D. Marine (UK) Limited, Scotland

[21] Appl. No.: 775,469

[22] Filed: Sep. 12, 1985

[30] Foreign Application Priority Data

Sep. 12, 1984 [GB] United Kingdom ............... 8423041
Oct. 31, 1984 [GB] United Kingdom ............... 8427584

[51] Int. Cl.⁴ .................. H01H 3/00; H01H 9/00; H01H 51/00
[52] U.S. Cl. .................... 219/72; 219/105; 219/136
[58] Field of Search ............ 219/72, 136, 75, 105

[56] References Cited

U.S. PATENT DOCUMENTS 3,658,231  4/1972  Gilman .................. 228/4
3,769,489  10/1973  Charlesworth .......... 219/105
4,035,602  7/1977  Berghof ................ 219/72
4,139,758  2/1979  Pinfold ................ 219/72

FOREIGN PATENT DOCUMENTS 1377757  12/1971  United Kingdom .
1511836  5/1978  United Kingdom .

Primary Examiner—E. A. Goldberg
Assistant Examiner—Lincoln D. Donovan
Attorney, Agent, or Firm—Ratner & Prestia

[57] ABSTRACT

Portable welding apparatus for use in underwater arc welding comprising a housing through whose wall extends a welding gun. The housing has an aperture for fitment over an item to be welded to a structure and the housing has a gas inlet for evacuation of water from the housing in use.

The apparatus preferably includes a rotatable housing portion on a fixed base so that welding can be performed around items which are contained wholly within the housing, thereby ensuring a dry environment for the well under water.

9 Claims, 11 Drawing Figures

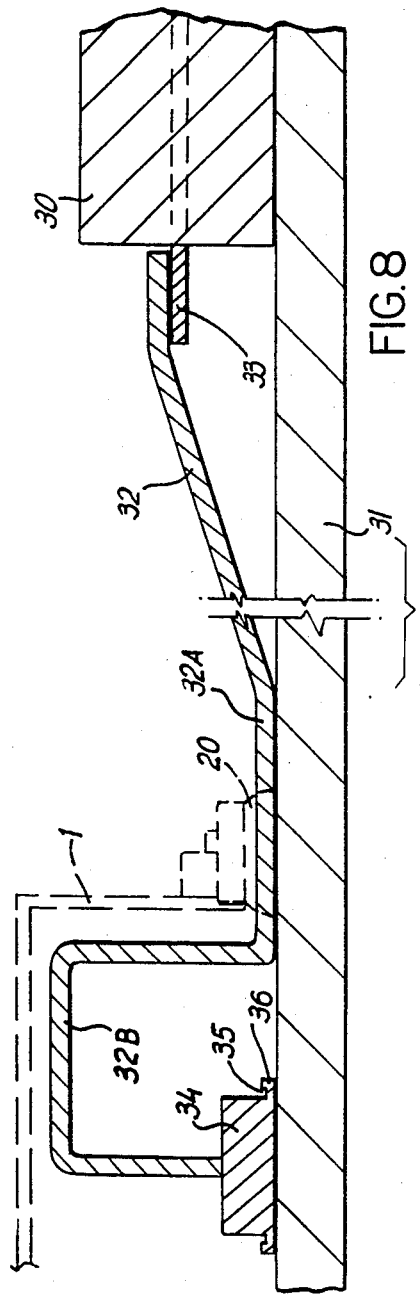
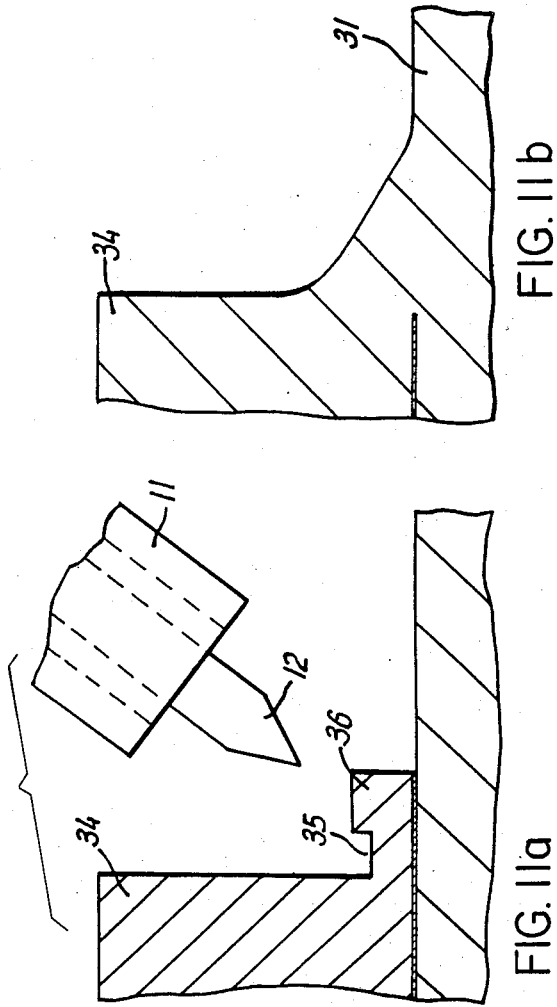
FIG. 8
FIG. 11a
FIG. 11b

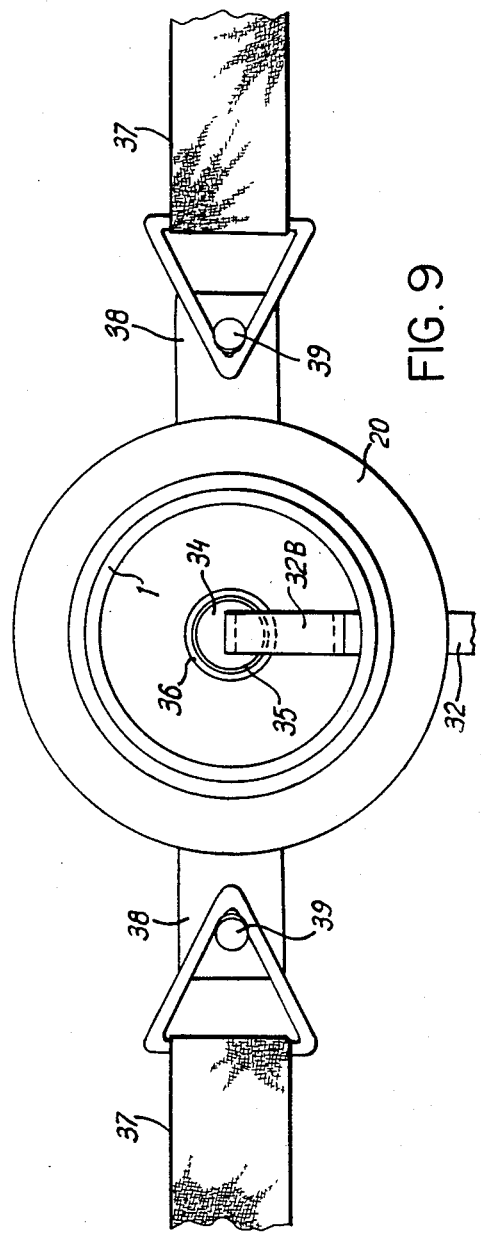
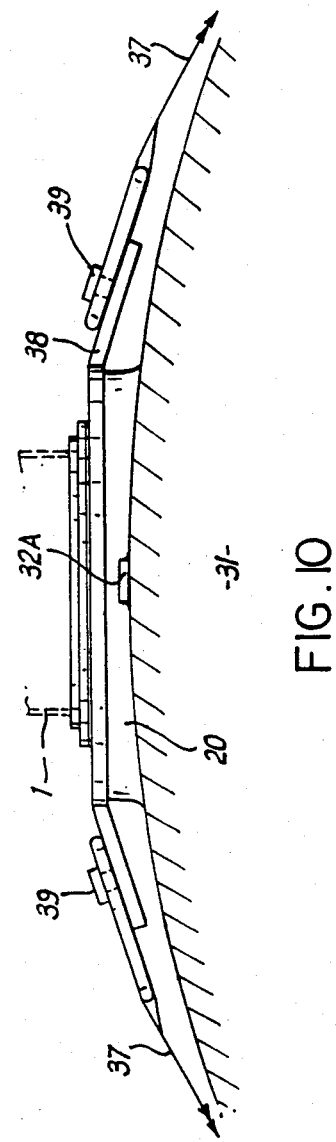
FIG. 9
FIG. 10

UNDERWATER ARC WELDING

FIELD OF THE INVENTION

This invention relates to underwater arc welding.

DESCRIPTION OF THE PRIOR ART

UK Pat. No. 1,377,757 describes and claims apparatus for use in underwater arc welding, in which a welding gun is disposed within a housing open at one end. This open end is placed over a workpiece to be welded and gas is pumped into the housing to ensure evacuation of water. Welding is then carried out using a consumable electrode in the dry atmosphere provided by the gas. A diver performs the welding operation from outside the housing.

This previously-proposed system has not found widespread use, mainly because of difficulties in providing a dry area at the point of weld when the weld is recessed below the workpiece surface. Further, the method of welding involves the use of a wire drive unit for the electrode as well as a gas line and power cable, so there is an unwieldy number of lines leading to the housing.

The prior art system was used particularly for fillet welds, and it proved difficult to maintain the weld area dry where it passed out of the housing.

SUMMARY OF THE INVENTION

According to the present invention there is provided apparatus for use in underwater arc welding, comprising a housing having a wall of which a first portion is translucent and a second portion defines an aperture through the wall, the second portion being visible through the translucent first portion, a welding gun passing sealingly through the housing wall, and a gas flow conduit passing sealingly through the housing wall, wherein the welding gun operates with a fixed non-consumable electrode.

Further according to the present invention there is provided a method of arc welding underwater comprising providing a dry environment around an area to be welded by enclosing the weld area in a housing and supplying gas to the housing to evacuate water therefrom, and moving a welding gun having a fixed non-consumable electrode around the weld area with an arc struck between the electrode and the weld area.

Preferably the housing comprises substantially rigid walling on which said translucent first portion is disposed and through which the welding gun passes, and a deformable base which forms said second portion defining said aperture, the rigid walling being rotatably mounted on the base so that in use the welding gun moves around the workpiece.

The apparatus and method of this invention are especially useful in welding anode connections to an underwater metallic structure; anodes are connected to these structures to provide sacrificial oxidation, thereby protecting the structure from corrosion. In such cases the anode connections may be welded to the structure by the present invention in dry conditions within the housing, and an advantage of this is that the connection can be welded directly to the structure's surface without recessing of the surface. The provision of the dry environment for the area to be welded prevents localised hardening of the structure which is a known result of wet welding.

Anode connections and other weld areas can if desired be adapted for use with the apparatus and method of the invention by providing a fusible material at their periphery so that on striking the arc the fusible material provides the weld between the connection and the structure; alternatively the weld may be formed directly between the connection and the structure, for example by providing a welding wire which is interposed in use between the electrode and the weld area.

Tungsten-inert-gas (TIG) welding is preferably used in the present invention.

When anode connections or other fitments are welded to a structure by means of this invention the fitment may be held in a releasable jig or the like within the housing. This can further simplify the welding process as it can allow accurate placement of the fitment on the structure by positioning relative to the housing without the need to set the fitment separately.

The translucent wall portion of the apparatus of this invention may be wholly or partly darkened so that the welding process can be observed through it; this obviates the need for a separate welding visor to be used by an operator.

BRIEF DESCRIPTION OF THE DRAWINGS

An embodiment of the invention will now be described by way of example with reference to the accompanying drawing, in which:

FIG. 8 is a sectional side view of a portion of a pipe to which an anode connection is being secured by the method and apparatus of the invention;

FIG. 9 is a plan view corresponding to FIG. 8 showing how the apparatus of the invention is secured to the pipe;

FIG. 10 is a front view corresponding to FIG. 9; and

FIG. 11(a) and (b) are part-sectional side views of the pad shown in FIG. 8 before and after welding.

DETAILED DESCRIPTION OF THE PREFERRED EMBODIMENTS

Figure 1:
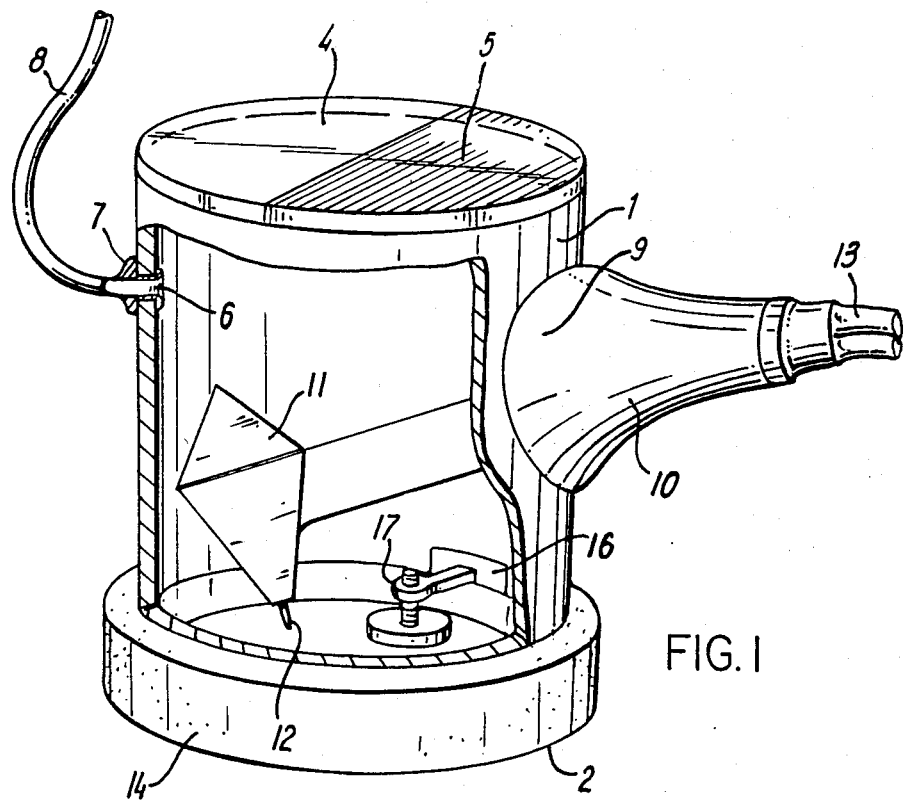
FIG. 1 is a perspective view, partly in section, of apparatus of this invention.
Figure 2:
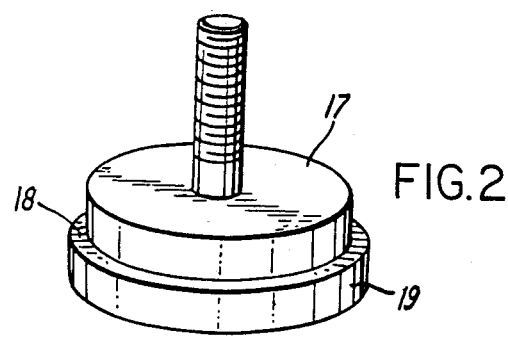
FIG. 2 is a perspective view of a stud plate for use with the apparatus of FIG. 1.
Figure 3:
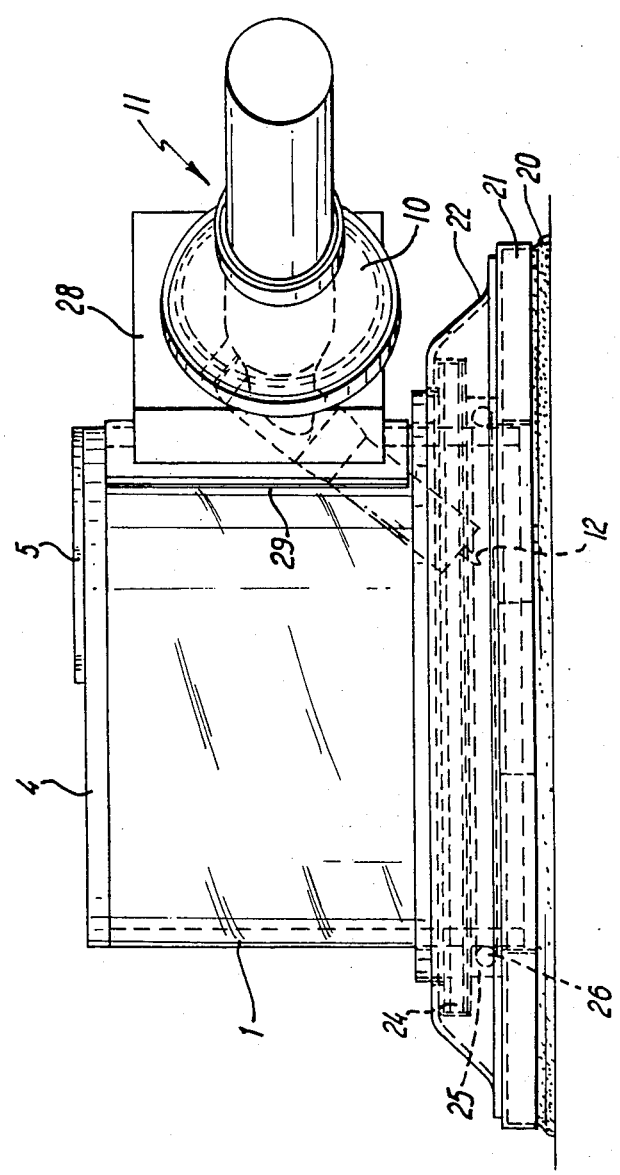
FIG. 3 is a side view of a further embodiment of apparatus of this invention.
Figure 4:
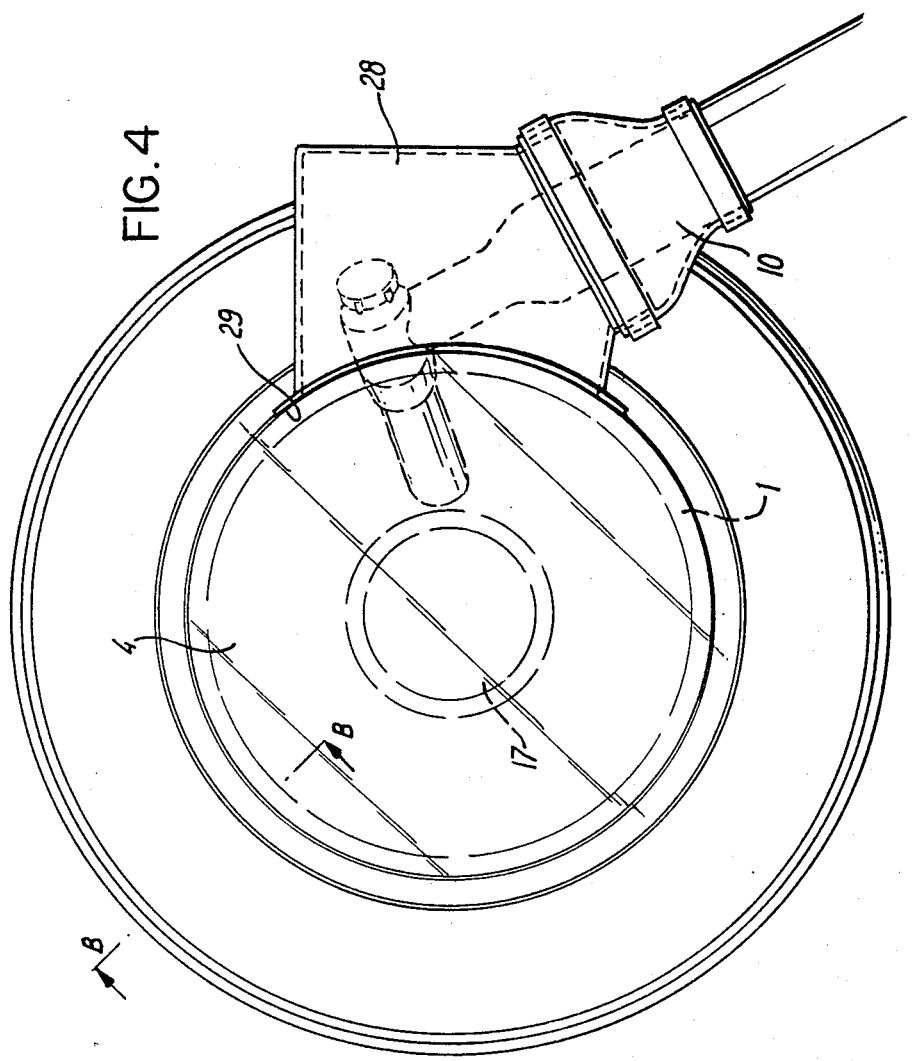
FIG. 4 is a plan view corresponding to FIG. 3.
Figure 5:
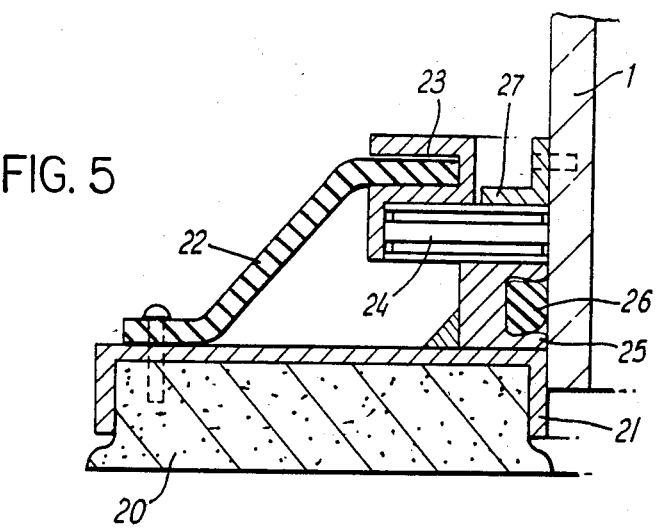
FIG. 5 is a section on B—B of FIG. 4.
Figure 6:
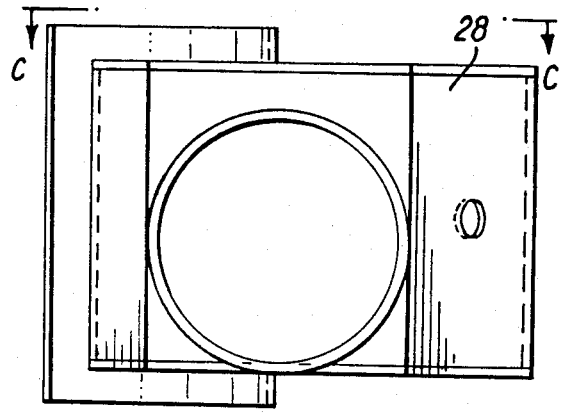
FIG. 6 is a side view of the torch housing of the apparatus of FIG. 3.
Figure 7:
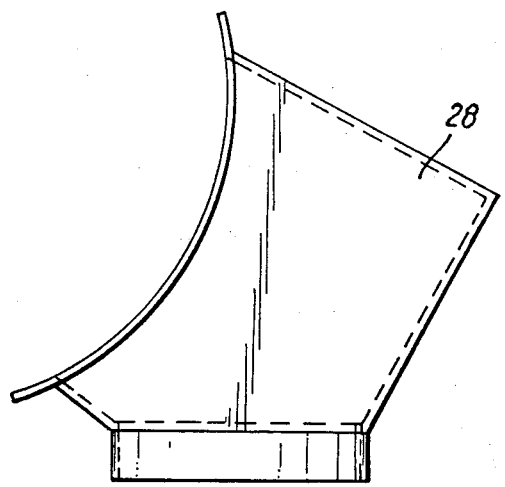
FIG. 7 is a plan view on C—C of FIG. 6.

Referring to FIGS. 1 and 2 of the drawings, the apparatus of this embodiment of the invention comprises a cylindrical housing 1 which is about 150 mm high and 150 mm in diameter, open at its lower end 2 and closed at its upper end by a Perspex disc 4. One half of the disc 4 is darkened to provide a viewing screen 5 for use during welding.

The wall of the housing 1 is apertured at 6 to receive a sealed connection 7 of a gas line 8, and at 9 to receive a neoprene boot 10 providing a seal through which passes a tungsten-inert-gas welding gun 11 having a fixed electrode 12. The welding gun 11 is supplied with electrical power through a cable 13.

A cellular sponge collar 14 extends around the lower portion of the housing wall to sit on a workpiece.

Extending inwardly from the inner face of the housing wall is a bracket 16, forming a jig within which a machined stud plate 17 is releasably held. The bracket is arranged so that the lower face of the stud plate 17 is at a level with the lower face of the collar 14.

The stud plate 17 has a base 18 (FIG. 2) which carries a land 19 formed from fusible metal, optionally containing also a flux material. This land 19 provides an "insert" type consumable for the welding process.

In use, the housing 1 is placed on an underwater structure such for example as an oil platform leg or a pipeline and gas, for example inert gas or an inert gas-/oxygen mix, is supplied along the gas line 8 at a pressure greater than ambient water pressure. This evacuates water from the housing 1 and provides a dry atmosphere. The collar 14 then provides a seal between the housing 1 and the structure, and with the lower face of the collar 14 engaging the structure the stud plate 17 also rests on the structure.

The welding gun 11 is then actuated through the cable 13 to strike an arc between the electrode 12 and the structure, and the gun 11 is guided, by means of the neoprene boot 10, so that the arc is struck at the joint between the stud plate 17 and the structure, that is at the land 19. The operator, viewing the work through the darkened viewing screen 5, then moves the housing 1 and/or the welding gun 11 so that the electrode 12 moves around the stud plate 17, causing the material of the land 19 to fuse and forming a weld between the plate 17 and the structure.

When the weld is completed the bracket 16 is released from the stud plate 17 and the housing 1 is removed. An anode can then be connected to the stud plate 19 to provide sacrificial oxidation, thus protecting the structure from corrosion.

This embodiment of the invention provides a quick, easy and convenient method of welding anode connections to an underwater structure in a dry environment. After the above-described operation, another stud plate 17 can be engaged in the bracket 16 and welded at a different site on the structure, and a large number of plates can thus be welded quickly and efficiently.

Referring now to FIGS. 3 to 7, the apparatus of this embodiment of the invention is generally similar in form to that of FIGS. 1 and 2, and corresponding parts have been given the same reference numerals. In this embodiment however the housing 1 is made of 150 mm diameter Perspex tube and is rotatably mounted on a 25 mm thick annular open-cell rubber seal 20.

An annular strip of steel channel 21 has mounted on it an annular rubber flange 22, and the flange 22 is bolted through the channel 21 to the rubber seal 20. The flange 22 extends upwardly and inwardly from the channel 21 and its free edge fits within an annular steel capping plate 23. The capping plate 23 sits on an annular thrust bearing 24 which is mounted on a steel 0-ring housing 25 welded to the channel 21 and retaining an 0-ring seal 26 in engagement against the outer face of the housing 1. The housing 1 has bolted to its outer face an annular steel angle 27 which is mounted on the thrust bearing 24.

Thus the housing 1 can rotate on the rubber seal 20 through the thrust bearing 24.

The tungsten-inert-gas welding torch 11 extends into the housing 1 through the boot to which is secured steel walling 28 by self-tapping screws, and sealed to the housing 1 through a neoprene gasket 29 which extends around their mating faces.

In use, the apparatus of FIGS. 3 to 7 operates in a generally similar manner to that of FIGS. 1 and 2, and with the torch 11 being moved around the stud plate 17 by simple rotation of the housing 1 on the rubber seal 20. This rotation may be effected either manually or by means of mechanical drive powered for example by an electric or hydraulic motor.

Referring now to FIGS. 8 to 11, the apparatus of this embodiment of the invention is generally the same as that of FIGS. 3 to 7 and is shown in broken lines in FIG. 8. An anode 30 is to be connected to a pipe 31 by means of a continuity strap 32. The strap 32 is prewelded at the surface to an anode core 33 which is partially embedded within the anode 30 to provide a good electrical connection spaced from the area of contact of the anode 30 with the pipe 31. The strap 32 is shaped to run along the pipe 31 surface at 32A and thereafter extend in an inverted U-shape at 32B, finally to be connected by welding at the surface to a pad 34 which is to form the connection point for the strap 32 to the pipe 31.

The pad 34 is generally cylindrical and has a peripheral web 35 at its lower end, the web 35 terminating in an annular reservoir of steel 36 of greater cross-sectional area than the web 35.

The anode 30, core 33, strap 32 and pad 34 are transported as a single prewelded unit to the underwater pipe 31, and the anode 30 is then mounted on the pipe. The anode 30 may be spaced from the pipe 31 to prevent localised corrosion, if desired.

An electrical connection then requires to be made between the anode 30 and the pipe 31 by way of the strap 32, and this is achieved by placing the housing 1 over the section 32A of the strap, ensuring that the pad 34 lies in the center of the housing. The deformable nature of the seal 20 ensures that the housing sits flush with the pipe 31. A webbing strap 37 is then connected to the housing 1 (FIGS. 9, 10) and passed round the pipe 31 to hold the housing steady on the pipe. For this purpose brackets 38 are provided at opposed sides of the fixed base 20, with projecting pins 39 for easy attachment of the strap 37.

The housing 1 is then evacuated of water as described in connection with FIGS. 1 and 2 and an arc is struck between the electrode 12 (FIG. 11a) and the annular reservoir 36 of the pad 34. This causes the reservoir 36, web 35 and part of the pad 34 wall to melt and become TIG welded to the pipe 31 in dry conditions; the shape of the web 35 and reservoir 36 allows an effective form of weld to be formed as shown in FIG. 11b.

The housing 1 is rotated either manually or by remote control on the base 20, and the weld is thus formed around the entire pad 34. The continuous supply of gas into the housing allows the operation to be carried out entirely in dry conditions and in a single operation within the housing.

Modifications and improvements may be made without departing from the scope of the invention.

We claim:

1. Apparatus for use in underwater arc welding, comprising a housing having a wall of which a base portion defines an aperture through the wall, a welding gun passing through the housing wall said welding gun and housing wall movable relative to said base portion, and a gas flow conduit passing through the housing wall, wherein the welding gun operates with a fixed non-consumable electrode, and means for guiding the welding gun for orbital movement relative to said base portion of the wall.

2. Apparatus for use in underwater arc welding, comprising a housing having a wall of which a base portion defines an aperture through the wall, a welding gun passing through the housing wall said welding gun and housing wall movable relative to said base portion, and a gas flow conduit passing through the housing wall, the welding gun operating with a fixed non-comsumable electrode, and means for guiding the welding gun for orbital movement relative to said base portion of the wall, wherein the housing comprises an upper substantially rigid portion through which the welding gun passes, and a deformable base portion defining said aperture, the rigid walling being rotatably mounted on the base.

3. Apparatus according to claim 1, wherein a second gas flow conduit passes through the housing wall to provide a stream of gas between the electrode of the welding gun and a workpiece.

4. Apparatus according to claim 3, wherein the welding gun, said gas flow conduit and said second gas flow conduit extend through a common aperture in the housing wall.

5. Apparatus according to claim 1, wherein a jig for receiving and positioning a workpiece extends into the housing from the housing wall.

6. Apparatus according to claim 5, including a workpiece having a peripheral band of fusible material.

7. A method of arc welding underwater comprising providing a dry environment around an area of a structure to be welded by enclosing the weld area in a housing which has a base portion in contact with the structure and supplying gas to the housing to evacuate water thereform, and moving a welding gun having a fixed non-consumable electrode around the weld area with an arc stuck between the electrode and the weld area, wherein the welding gun is moved orbitally relative to said base portion of the housing.

8. A method according to claim 7, wherein the weld area is entirely enclosed within the housing.

9. A method of arc welding underwater comprising prividing a dry environment around an area of a structure to be welded by enclosing the weld area in a housing which has a base portion in contact with the structure and supplying gas to the housing to evacuate water thereform and moving a welding gun having a fixed non-comsumble electrode around the weld area with an arc stuck between the electrode and the weld area, the welding gun being moved orbitally relative to said base portion of the housing, wherein the housing has a wall portion through which the welding gun passes and said base portion defines an aperture through which the weld area passes into the housing, and the welding gun is moved by rotating the wall portion on the base portion so that the gun is moved around the weld area.

* * * * *